US011862380B2

(12) United States Patent
Mizukami et al.

(10) Patent No.: US 11,862,380 B2
(45) Date of Patent: Jan. 2, 2024

(54) INDUCTOR

(71) Applicant: Murata Manufacturing Co., Ltd., Kyoto-fu (JP)

(72) Inventors: Takashi Mizukami, Nagaokakyo (JP); Yasuo Matsumoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 17/930,374

(22) Filed: Sep. 7, 2022

(65) Prior Publication Data

US 2023/0005655 A1 Jan. 5, 2023

Related U.S. Application Data

(63) Continuation of application No. 16/887,925, filed on May 29, 2020, now Pat. No. 11,469,034.

(30) Foreign Application Priority Data

Jul. 27, 2019 (JP) ................................ 2019-138342

(51) Int. Cl.
*H01F 27/28* (2006.01)
*H01F 17/00* (2006.01)
*H01F 27/29* (2006.01)

(52) U.S. Cl.
CPC ..... *H01F 27/2804* (2013.01); *H01F 17/0013* (2013.01); *H01F 27/2847* (2013.01); *H01F 27/292* (2013.01); *H01F 2027/2809* (2013.01)

(58) Field of Classification Search
CPC .. H01F 27/2804; H01F 27/2852; H01F 27/28; H01F 27/29
See application file for complete search history.

(56) References Cited

U.S. PATENT DOCUMENTS 6,218,925 B1 * 4/2001 Iwao .................... H01F 27/292 336/200
2009/0153282 A1 * 6/2009 Taoka .................. H01F 27/022 336/200

(Continued)

FOREIGN PATENT DOCUMENTS

CN 101361146 A 2/2009
CN 107808734 A 3/2018

(Continued)

OTHER PUBLICATIONS

An Office Action mailed by China National Intellectual Property Administration dated Jan. 18, 2022, which corresponds to Chinese Patent Application No. 202010668133.1 and is related to U.S. Appl. No. 16/887,925 with English language translation.

(Continued)

*Primary Examiner* — Sherman Ng
(74) *Attorney, Agent, or Firm* — Studebaker & Brackett PC

(57) ABSTRACT

Anchor conductors extending from internal terminal conductors and being in contact with a component body are provided inside the component body. The anchor conductors are provided so as not to be connected to a coil conductor including a circulating portion, and so as not to be exposed on an outer surface of the component body. The anchor conductors are in contact with the component body to thereby enhance fixing force of the internal terminal conductors to the component body.

11 Claims, 10 Drawing Sheets

(56) References Cited

U.S. PATENT DOCUMENTS

| | | | |
|---|---|---|---|
| 2012/0227250 A1 | 9/2012 | Yamano | |
| 2016/0099100 A1 | 4/2016 | Park et al. | |
| 2018/0068780 A1 | 3/2018 | Shimoda et al. | |
| 2018/0166206 A1* | 6/2018 | Ueyama | H01F 17/0013 |
| 2018/0174758 A1* | 6/2018 | Lee | H01G 4/232 |
| 2019/0006071 A1* | 1/2019 | Sekiguchi | H01F 17/0013 |
| 2019/0051450 A1 | 2/2019 | Shimoda et al. | |
| 2019/0333686 A1 | 10/2019 | Kazuta et al. | |

FOREIGN PATENT DOCUMENTS

| | | | |
|---|---|---|---|
| CN | 109390138 | A | 2/2019 |
| CN | 110415915 | A | 11/2019 |
| JP | 2017-073536 | A | 4/2017 |
| JP | 2017-174970 | A | 9/2017 |
| JP | 2018-198269 | A | 12/2018 |
| JP | 2019-033127 | A | 2/2019 |
| JP | 2019-036589 | A | 3/2019 |
| JP | 2019-075535 | A | 5/2019 |
| JP | 2019-192829 | A | 10/2019 |

OTHER PUBLICATIONS

An Office Action; “Notice of Reasons for Refusal,” mailed by the Japanese Patent Office dated Mar. 15, 2022, which corresponds to Japanese Patent Application No. 2019-138342 and is related to U.S. Appl. No. 16/887,925 with English language translation.

* cited by examiner 47
47
19-2
19-1

30-1
23-1
23-1
25-1
29-1

30-1
43
23-1
23-1
41
25-1
42
29-1
19-3

30-1
23-2
25-3
23-2
25-2
24-1
29-1
23-1
23-1
25-1

30-1
46
23-2
44
25-3
23-2
25-2
24-1
45
29-1
19-4

30-2
23-3
25-4
24-2
25-3
23-2
23-3
25-5
25-2
24-1
29-2
30-1
23-2
23-1
25-1
29-1

INDUCTOR

CROSS-REFERENCE TO RELATED APPLICATION

This application is a Continuation of U.S. patent application Ser. No. 16/887,925, filed on May 29, 2020, which claims benefit of priority to Japanese Patent Application No. 2019-138342, filed Jul. 27, 2019, the entire content of which is incorporated herein by reference.

BACKGROUND

Technical Field

The present disclosure relates to an inductor, and more particularly, relates to an inductor having a structure in which a coil conductor is disposed inside a component body made of a non-conductive material.

Background Art

An inductor of interest to the present disclosure includes a component body having a laminated structure formed by laminating a plurality of non-conductive material layers as described in, for example, Japanese Unexamined Patent Application Publication No. 2019-33127, and a coil conductor is provided inside the component body. FIG. 12 corresponds to FIG. 3 in Japanese Unexamined Patent Application Publication No. 2019-33127, and is a diagram showing an inductor 1 in a direction perpendicular to a side surface 3 of a component body 2. In FIG. 12, a coil conductor 4 and internal terminal conductors 5 and 6 disposed inside the component body 2 are schematically shown in a perspective view in a coil axis direction of the coil conductor 4.

Although not shown in detail, a first extended conductor and a second extended conductor are respectively connected to a first end portion and a second end portion of the coil conductor 4 opposite to each other, and the first extended conductor and the second extended conductor are respectively connected to the first internal terminal conductor 5 and the second internal terminal conductor 6. The internal terminal conductors 5 and 6 serve as terminals of the inductor 1, and are partially exposed on an outer surface of the component body 2 while being disposed so as to be embedded inside the component body 2. An external terminal conductor (not shown) may be formed, for example, with a plating film so as to cover each of the exposed portions of the internal terminal conductors 5 and 6.

The first internal terminal conductor 5 and the second internal terminal conductor 6 are separated from each other and are respectively exposed on a side of a first end surface 8 and a side of a second end surface 9 on a mounting surface 7 facing a side of the mounting substrate of the component body 2. Further, the first internal terminal conductor 5 is exposed on the first end surface 8 while continuing to the portion exposed on the mounting surface 7, and the second internal terminal conductor 6 is exposed on the second end surface 9 while continuing to the portion exposed on the mounting surface 7. In this manner, each of the internal terminal conductors 5 and 6 has an L-shape as shown in FIG. 12.

When the inductor 1 described in the aforementioned Japanese Unexamined Patent Application Publication No. 2019-33127 is mounted on the mounting substrate, each of the internal terminal conductors 5 and 6 serving as terminals is soldered to a conductive land on the side of the mounting substrate. As described above, when the external terminal conductor is provided so as to cover each of the exposed portions of the internal terminal conductors 5 and 6, each of the internal terminal conductors 5 and 6 is soldered to the conductive land on the side of the mounting substrate with the external terminal conductor interposed therebetween.

In the inductor 1 in the mounted state as described above, the internal terminal conductors 5 and 6 may slip off from the component body 2, so that conduction failure between each of the internal terminal conductors 5 and 6 and the coil conductor 4 may become a problem. The slip-off of the internal terminal conductors 5 and 6 is caused by a difference in expansion and contraction behavior between different materials from each other due to temperature change or thermal shock in many cases.

The temperature change is caused, for example, by a change in temperature of an environment where the inductor 1 is placed, and the thermal shock is caused by heat during a solder reflow process to be applied when the inductor 1 or other components are mounted on the mounting substrate, for example.

Further, the difference in expansion and contraction behavior typically appears between the component body 2 and the mounting substrate in the inductor 1 in the mounted state. For example, the mounting substrate expands and contracts along with the internal terminal conductors 5 and 6, and on the other hand, the difference in expansion and contraction behavior appears between the component body 2 which exhibits different expansion and contraction behavior and the mounting substrate, which causes inconvenience that the internal terminal conductors 5 and 6 slip off from the component body 2. Also, the difference in expansion and contraction behavior between each of the internal terminal conductors 5 and 6 and the component body 2 also causes the slip-off of the internal terminal conductors 5 and 6.

SUMMARY

Accordingly, the present disclosure provides an inductor in which an internal terminal conductor is less likely to slip off even due to temperature change or thermal shock.

An inductor according to preferred embodiments of the present disclosure includes a component body made of a non-conductive material, a coil conductor disposed inside the component body and including a first end portion and a second end portion opposite to each other and a circulating portion between the first end portion and the second end portion, a first extended conductor and a second extended conductor respectively connected to the first end portion and the second end portion of the coil conductor, and a first internal terminal conductor and a second internal terminal conductor respectively connected to the first extended conductor and the second extended conductor, and partially exposed on an outer surface of the component body while being disposed so as to be embedded inside the component body. The inductor further includes a first anchor conductor and a second anchor conductor respectively extending from the first internal terminal conductor and the second internal terminal conductor in a state of being in contact with the component body, but not connected to the coil conductor.

Other features, elements, characteristics and advantages of the present disclosure will become more apparent from the following detailed description of preferred embodiments of the present disclosure with reference to the attached drawings.

DETAILED DESCRIPTION

First Embodiment

With reference to FIG. 1 to FIG. 4, an inductor 11 according to a first embodiment of the present disclosure will be described.

The inductor 11 includes a component body 12. The component body 12 is made of, for example, a non-conductive material containing at least one type of glass, resin, and ferrite. In addition, in a case where the component body 12 is a molded body formed of resin or the like, the molded body may contain a non-magnetic filler such as silica, or a magnetic filler such as ferrite or a metal magnetic material. Further, the molded body may have a structure formed with a combination of a plurality of materials among glass, ferrite and resin. The component body 12 has a substantially rectangular parallelepiped shape. For example, the substantially rectangular parallelepiped shape may be a shape in which rounded or chamfered portions are provided at a ridge portion and a corner portion.

Figure 1:
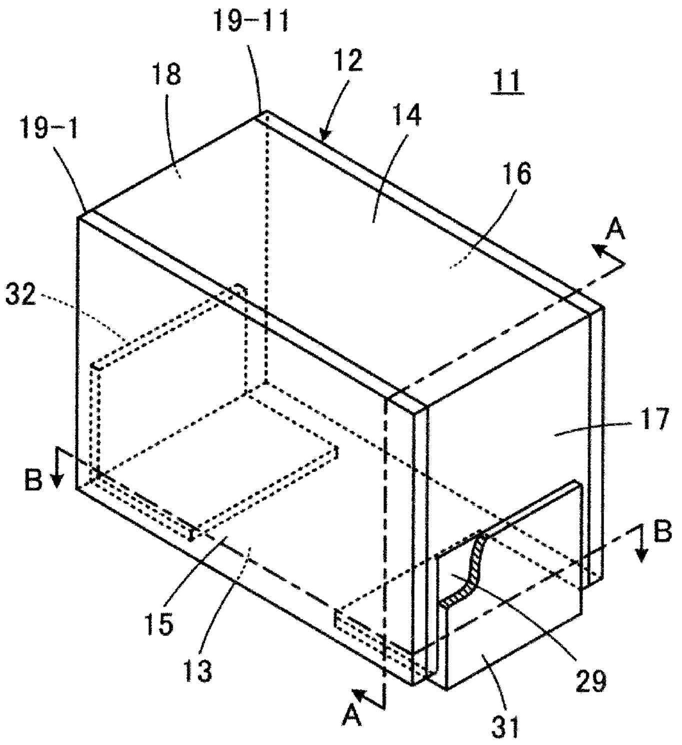
FIG. 1 is a perspective view showing an external appearance of an inductor according to a first embodiment of the present disclosure.

More specifically, as shown in FIG. 1, the component body 12 having the substantially rectangular parallelepiped shape includes a mounting surface 13 facing a side of a mounting substrate, a top surface 14 facing the mounting surface 13, a first side surface 15 and a second side surface 16 connecting between the mounting surface 13 and the top surface 14 and facing each other, and a first end surface 17 and a second end surface 18 facing each other and connecting both between the mounting surface 13 and the top surface 14 and between the first side surface 15 and the second side surface 16.

Figure 2:
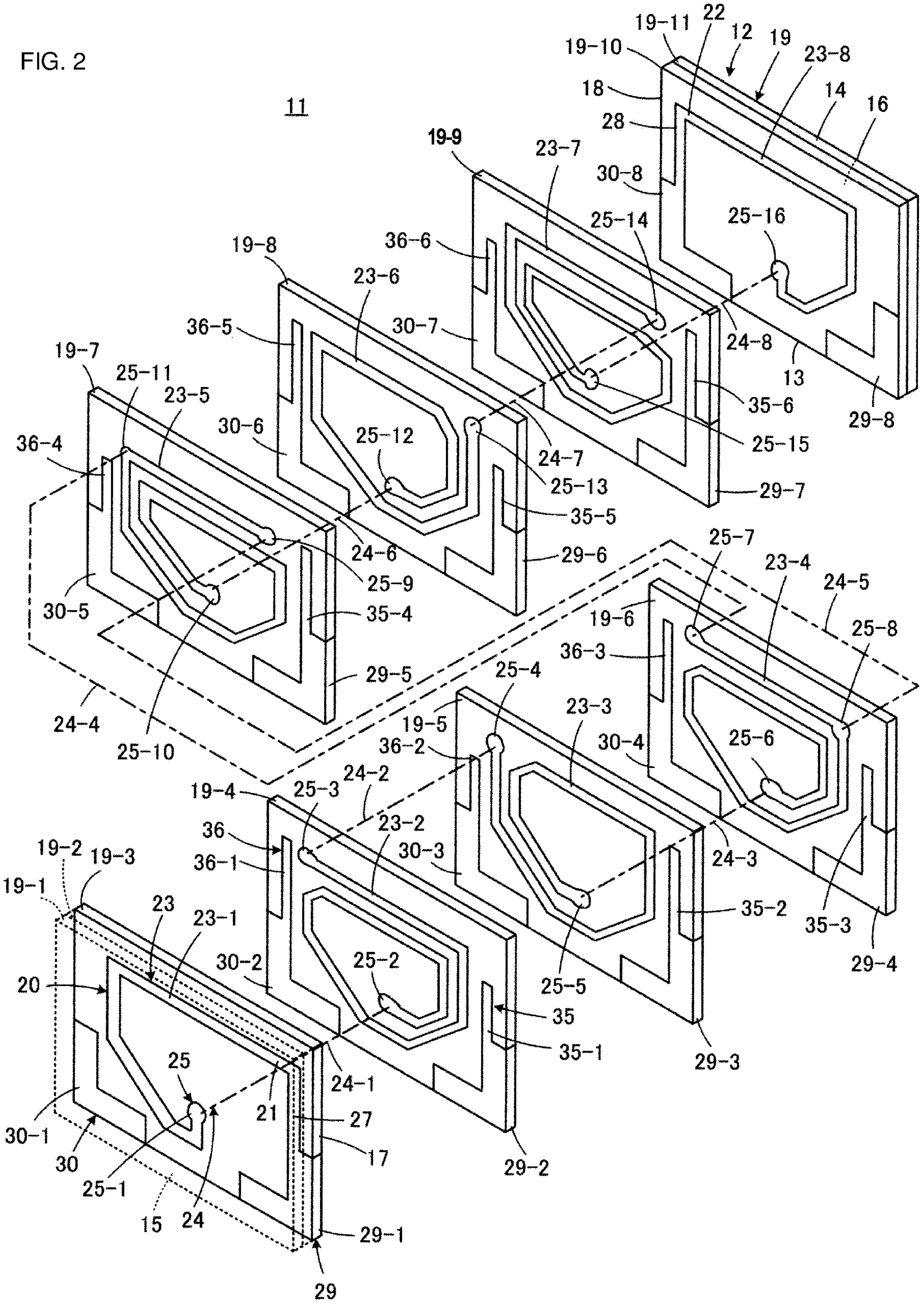
FIG. 2 is a perspective view showing the inductor shown in FIG. 1 in an exploded state, and an external terminal conductor is not shown.

As shown in FIG. 2, the component body 12 has a laminated structure in which a plurality of non-conductive material layers 19 is laminated. The plurality of non-conductive material layers 19 extends in an extending direction of the first end surface 17 and the second end surface 18 and is laminated in a direction parallel to the mounting surface 13.

A coil conductor 20 extending in a substantially spiral shape is disposed inside the component body 12. The coil conductor 20 includes a first end portion 21 and a second end portion 22 opposite to each other, and includes a plurality of circulating portions 23 extending so as to form a part of an annular orbit along an interface of any of the plurality of non-conductive material layers 19 between the first end portion 21 and the second end portion 22, and a plurality of via hole conductors 24 penetrating through any of the non-conductive material layers 19 in a thickness direction. The coil conductor 20 is given a form extending in the substantially spiral shape by alternately connecting the circulating portions 23 and the via hole conductors 24 described above. A via pad 25 having a relatively large area for connection with the via hole conductor 24 is provided at each of each end portion and a specific portion of each of the plurality of circulating portions 23. In FIG. 2, the via hole conductors 24 are indicated by dashed-dotted lines for an electrical connection state thereof.

A first extended conductor 27 and a second extended conductor 28 are respectively connected to the first end portion 21 and the second end portion 22 of the coil conductor 20. The first extended conductor 27 and the second extended conductor 28 are provided by extension portions of the circulating portion 23 positioning the first end portion 21 and the second end portion 22 of the coil conductor 20, respectively.

The first extended conductor 27 and the second extended conductor 28 are respectively connected to a first internal terminal conductor 29 and a second internal terminal conductor 30. The internal terminal conductors 29 and 30 are to be terminals of the inductor 11, and are partially exposed on the outer surface of the component body 12 while being disposed so as to be embedded inside the component body 12.

In this embodiment, the first internal terminal conductor 29 and the second internal terminal conductor 30 are separated from each other and are respectively exposed to a side of the first end surface 17 and a side of the second end surface 18 on the mounting surface 13 of the component body 12, and the first internal terminal conductor 29 is exposed on the first end surface 17 while continuing to the portion exposed on the mounting surface 13, and the second internal terminal conductor 30 is exposed on the second end surface 18 while continuing to the portion exposed on the mounting surface 13.

Figure 3:
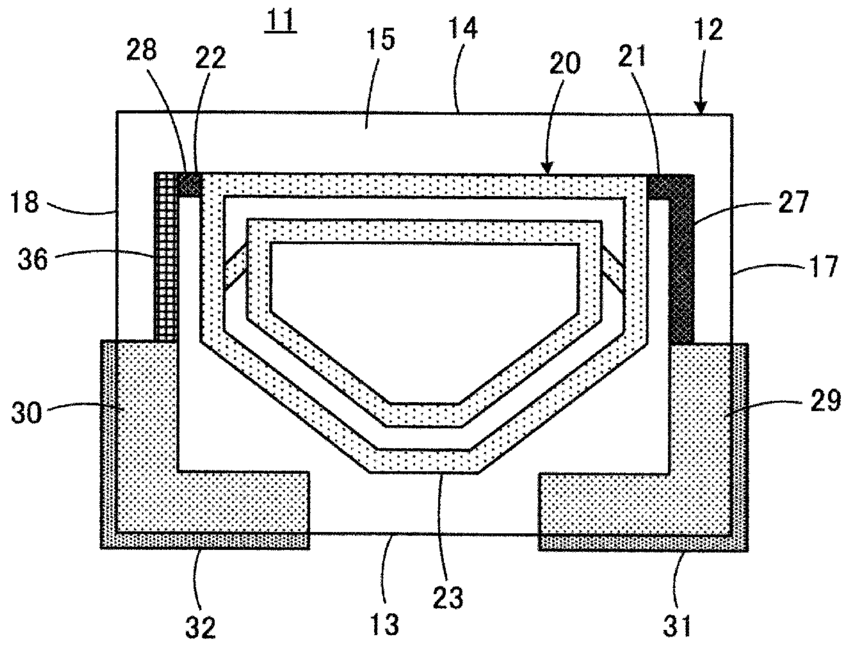
FIG. 3 is a schematic view showing the inductor shown in FIG. 1 in a perspective view in a coil axis direction of a coil conductor.

In this manner, each of the internal terminal conductors 29 and 30 is formed substantially in an L-shape as shown in FIG. 2 and FIG. 3. In this manner, according to a configuration in which each of the internal terminal conductors 29 and 30 is exposed over adjacent two surfaces of the component body 12, when the inductor 11 is mounted on the mounting substrate, a solder fillet in an appropriate form can be formed, so that a highly reliable mounting state can be obtained in both electrical connection and mechanical joint.

Figure 4:
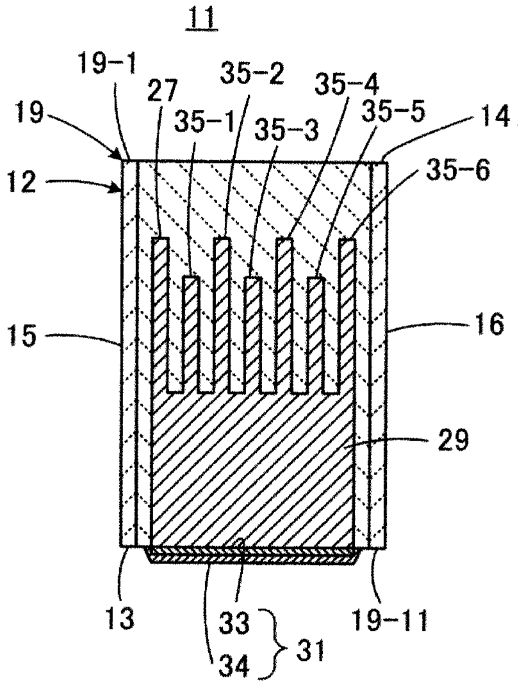
FIG. 4 is a cross-sectional view taken along a plane A-A in FIG. 1 of the inductor shown in FIG. 1.

As shown in FIG. 1, FIG. 3, and FIG. 4, as appropriate, a first external terminal conductor 31 and a second external terminal conductor 32 may be provided so as to cover the exposed portions of the first internal terminal conductor 29 and the second internal terminal conductor 30, respectively. The external terminal conductors 31 and 32 can have functions of improving solder wettability of the internal terminal conductors 29 and 30 containing silver, for example, as a conductive component, and preventing solder erosion.

Additionally, when the external terminal conductors 31 and 32 are made of plating films, with the exposed portions of the internal terminal conductors 29 and 30 used as an base for deposition of an electroplating film, the external terminal conductors 31 and 32 can be efficiently formed at required locations. Each of the external terminal conductors 31 and 32 is configured with, for example, a nickel plating layer 33 as the base and a tin plating layer 34 thereon, as shown in FIG. 4. According to this configuration, it is possible to advantageously cause the external terminal conductors 31 and 32 to exhibit the above-described functions of improving the solder wettability and preventing the solder erosion. Note that a copper plating layer may be formed instead of the nickel plating layer 33, and a copper plating layer may be formed between the nickel plating layer 33 and the tin plating layer 34.

As an example of dimensions of some portions of an actual product of the inductor 11, a dimension in a longitudinal direction of each of mounting surface 13 and top surface 14 is 0.6±0.03 mm, and a dimension in a width direction of each of them is 0.3±0.03 mm, a dimension in a height direction of each of the side surfaces 15 and 16 is 0.4±0.02 mm, a dimension in a height direction of each of the external terminal conductors 31 and 32 on the end surfaces 17 and 18 is 0.2±0.03 mm, and a dimension in a width direction of each of them is 0.24±0.03 mm, and a dimension of each of the external terminal conductors 31 and 32 on the mounting surface 13 is 0.15±0.03 mm when measured in a longitudinal direction of the mounting surface 13.

As a characteristic configuration of this embodiment, a first anchor conductor 35 and a second anchor conductor 36 which respectively extend from the first internal terminal conductor 29 and the second internal terminal conductor 30 in a state where they are in contact with the component body 12 but, not connected to the coil conductor 20 are provided. Since the anchor conductors 35 and 36 are in contact with the component body 12, fixing force of the internal terminal conductors 29 and 30 to the component body 12 is increased, and as a result, it is possible to prevent the internal terminal conductors 29 and 30 from slipping off from the component body 12 due to temperature change or thermal shock.

The first anchor conductor 35 and the second anchor conductor 36 are preferably provided inside the component body 12 in a state in which they are not exposed on the outer surface of the component body 12. According to this configuration, a contact area between each of the anchor conductors 35 and 36 and the component body 12 can be widened, and a configuration can be implemented in which the anchor conductors 35 and 36 are held in specific portions of the component body 12. Therefore, the fixing force of the internal terminal conductors 29 and 30 to the component body 12 can be further enhanced.

Boundaries among the coil conductor 20, the extended conductors 27 and 28, the internal terminal conductors 29 and 30, and the anchor conductors 35 and 36, as described above, may be understood from forms of the coil conductor 20, the extended conductors 27 and 28, the internal terminal conductors 29 and 30, and the anchor conductor 36 which are schematically illustrated in FIG. 3 by using different hatchings from each other.

As described above, although the component body 12 has the laminated structure in which the plurality of non-conductive material layers 19 is laminated, the interfaces between the plurality of non-conductive material layers 19 which embody the laminated structure almost disappear in the actual product through a sintering process or a solidification process in many cases. However, for the sake of convenience for explanation, on the assumption that the laminated structure of the non-conductive material layers 19 exists, the non-conductive material layer 19 and its associated configuration will be described for each non-conductive material layer 19 mainly with reference to FIG. 2.

Note that, in the following description, when it is necessary to focus on and describe a specific one of the plurality of non-conductive material layers 19, reference signs, such as "19-1", "19-2", . . . , for which sub-numbers are assigned to "19" are used. Also, for each of the plurality of circulating portions 23, the plurality of via hole conductors 24, the plurality of via pads 25, the plurality of first anchor conductors 35, and the plurality of second anchor conductors 36, the similar usage of the reference signs to that in the above-described case of the non-conductive material layer 19 is adopted.

In FIG. 2, 11 non-conductive material layers 19-1, 19-2, . . . , 19-11 are illustrated. These non-conductive material layers 19-1, 19-2, . . . , 19-11 are laminated from the first side surface 15 toward the second side surface 16 in this order.

The two non-conductive material layers 19-1 and 19-11 located at the endmost positions are colored different from the other non-conductive material layers 19 by addition of pigment, for example, such as cobalt. This is to facilitate detection when the inductor 11 is overturned or the like in mounting.

Hereinafter, a formation mode of a conductor such as the coil conductor 20 will be described in the order from the non-conductive material layer 19-1 to the non-conductive material layer 19-11.

(1) On the interface between the non-conductive material layers 19-2 and 19-3, the first extended conductor 27 and the circulating portion 23-1 continuing thereto and having less than one turn are provided, and the via pad 25-1 is provided at the end portion of the circulating portion 23-1. Although not shown in detail, the via hole conductor 24-1 penetrating through the non-conductive material layer 19-3 in the thickness direction is provided so as to be connected to the via pad 25-1. The first extended conductor 27 is connected to the first internal terminal conductor 29.

In the non-conductive material layer 19-3, a first terminal conductor piece 29-1 which is a part of the first internal terminal conductor 29 and a second terminal conductor piece 30-1 which is a part of the second internal terminal conductor 30 are provided so as to penetrate through the non-conductive material layer 19-3 in the thickness direction, that is, in the laminating direction.

(2) On the interface between the non-conductive material layers 19-3 and 19-4, the circulating portion 23-2 exceeding one turn is provided, and the via pads 25-2 and 25-3 are individually provided at both end portions of the circulating portion 23-2. The via pad 25-2 is connected to the via hole conductor 24-1 described above. On the other hand, the via hole conductor 24-2 penetrating through the non-conductive material layer 19-4 in the thickness direction is provided so as to be connected to the via pad 25-3.

In the non-conductive material layer 19-4, a first terminal conductor piece 29-2 which is a part of the first internal terminal conductor 29 and a second terminal conductor piece 30-2 which is a part of the second internal terminal conductor 30 are provided so as to penetrate through the non-conductive material layer 19-4 in the thickness direction.

Further, the first anchor conductor 35-1 extending from the first internal terminal conductor 29 and the second anchor conductor 36-1 extending from the second internal terminal conductor 30 are provided on the interface between the non-conductive material layers 19-3 and 19-4.

(3) On the interface between the non-conductive material layers 19-4 and 19-5, the circulating portion 23-3 exceeding one turn is provided, and the via pads 25-4 and 25-5 are individually provided at both end portions of the circulating portion 23-3. The via pad 25-4 is connected to the via hole conductor 24-2 described above. On the other hand, the via hole conductor 24-3 penetrating through the non-conductive material layer 19-5 in the thickness direction is provided so as to be connected to the via pad 25-5.

In the non-conductive material layer 19-5, a first terminal conductor piece 29-3 which is a part of the first internal terminal conductor 29 and a second terminal conductor piece 30-3 which is a part of the second internal terminal conductor 30 are provided so as to penetrate through the non-conductive material layer 19-5 in the thickness direction.

Further, the first anchor conductor 35-2 extending from the first internal terminal conductor 29 and the second anchor conductor 36-2 extending from the second internal terminal conductor 30 are provided on the interface between the non-conductive material layers 19-4 and 19-5.

(4) On the interface between the non-conductive material layers 19-5 and 19-6, the circulating portion 23-4 exceeding one turn is provided, and the via pads 25-6 and 25-7 are individually provided at both end portions of the circulating portion 23-4. The via pad 25-6 is connected to the via hole conductor 24-3 described above. On the other hand, the via hole conductor 24-4 penetrating through the non-conductive material layer 19-6 in the thickness direction is provided so as to be connected to the via pad 25-7.

In addition, the via pad 25-8 is provided in an intermediate portion of the circulating portion 23-4 described above. In the non-conductive material layer 19-6, the via hole conductor 24-5 penetrating through the non-conductive material layer 19-6 in the thickness direction is provided so as to be connected to the via pad 25-8.

In the non-conductive material layer 19-6, a first terminal conductor piece 29-4 which is a part of the first internal terminal conductor 29 and a second terminal conductor piece 30-4 which is a part of the second internal terminal conductor 30 are provided so as to penetrate through the non-conductive material layer 19-6 in the thickness direction.

Further, the first anchor conductor 35-3 extending from the first internal terminal conductor 29 and the second anchor conductor 36-3 extending from the second internal terminal conductor 30 are provided on the interface between the non-conductive material layers 19-5 and 19-6.

(5) On the interface between the non-conductive material layers 19-6 and 19-7, the circulating portion 23-5 exceeding one turn is provided, and the via pads 25-9 and 25-10 are individually provided at both end portions of the circulating portion 23-5. The via pad 25-9 is connected to the via hole conductor 24-5 described above. On the other hand, the via hole conductor 24-6 penetrating through the non-conductive material layer 19-7 in the thickness direction is provided so as to be connected to the via pad 25-10.

In addition, the via pad 25-11 is provided in an intermediate portion of the circulating portion 23-5 described above. The via pad 25-11 is connected to the via hole conductor 24-4 described above.

In the non-conductive material layer 19-7, a first terminal conductor piece 29-5 which is a part of the first internal terminal conductor 29 and a second terminal conductor piece 30-5 which is a part of the second internal terminal conductor 30 are provided so as to penetrate through the non-conductive material layer 19-7 in the thickness direction.

Further, the first anchor conductor 35-4 extending from the first internal terminal conductor 29 and the second anchor conductor 36-4 extending from the second internal terminal conductor 30 are provided on the interface between the non-conductive material layers 19-6 and 19-7.

(6) On the interface between the non-conductive material layers 19-7 and 19-8, the circulating portion 23-6 exceeding one turn is provided, and the via pads 25-12 and 25-13 are individually provided at both end portions of the circulating portion 23-6. The via pad 25-12 is connected to the via hole conductor 24-6 described above. On the other hand, the via hole conductor 24-7 penetrating through the non-conductive material layer 19-8 in the thickness direction is provided so as to be connected to the via pad 25-13.

In the non-conductive material layer 19-8, a first terminal conductor piece 29-6 which is a part of the first internal terminal conductor 29 and a second terminal conductor piece 30-6 which is a part of the second internal terminal conductor 30 are provided so as to penetrate through the non-conductive material layer 19-8 in the thickness direction.

Further, the first anchor conductor 35-5 extending from the first internal terminal conductor 29 and the second anchor conductor 36-5 extending from the second internal terminal conductor 30 are provided on the interface between the non-conductive material layers 19-7 and 19-8.

(7) On the interface between the non-conductive material layers 19-8 and 19-9, the circulating portion 23-7 exceeding one turn is provided, and the via pads 25-14 and 25-15 are individually provided at both end portions of the circulating portion 23-7. The via pad 25-14 is connected to the via hole conductor 24-7 described above. On the other hand, the via hole conductor 24-8 penetrating through the non-conductive material layer 19-9 in the thickness direction is provided so as to be connected to the via pad 25-15.

In the non-conductive material layer 19-9, a first terminal conductor piece 29-7 which is a part of the first internal terminal conductor 29 and a second terminal conductor piece 30-7 which is a part of the second internal terminal conductor 30 are provided so as to penetrate through the non-conductive material layer 19-9 in the thickness direction.

Further, the first anchor conductor 35-6 extending from the first internal terminal conductor 29 and the second anchor conductor 36-6 extending from the second internal terminal conductor 30 are provided on the interface between the non-conductive material layers 19-8 and 19-9.

(8) On the interface between the non-conductive material layers 19-9 and 19-10, the circulating portion 23-8 having less than one turn and the second extended conductor 28 continuing thereto are provided, and the via pad 25-16 is provided at the end portion of the circulating portion 23-8.

The via pad 25-16 is connected to the via hole conductor 24-8 described above. The second extended conductor 28 is connected to the second internal terminal conductor 30.

A first terminal conductor piece 29-8 which is a part of the first internal terminal conductor 29 and a second terminal conductor piece 30-8 which is a part of the second internal terminal conductor 30 are provided in the non-conductive material layer 19-10. As shown in FIG. 2, the first terminal conductor piece 29-8 and the second terminal conductor piece 30-8 may be provided along the interface between the non-conductive material layers 19-9 and 19-10, or may be provided so as to penetrate through the non-conductive material layer 19-10 in the thickness direction.

In the above-described (4) and (5), it has been described that the via pad 25-8 is provided in the intermediate portion of the circulating portion 23-4, and the via hole conductor 24-5 is provided so as to be connected to the via pad 25-8, and the via pad 25-11 is provided in the intermediate portion of the circulating portion 23-5, and the via hole conductor 24-4 is provided so as to be connected to the via pad 25-11. That is, the end portion of the circulating portion 23-4 is connected to the intermediate portion of the circulating portion 23-5 by the via hole conductor 24-4, and the intermediate portion of the circulating portion 23-4 is connected to the end portion of the circulating portion 23-5 by the via hole conductor 24-5. This is because the coil conductor 20 is made to have a shape that is substantially 180 degrees rotationally symmetric so that the inductor 11 does not have directivity.

In the inductor 11 having the above configuration, the coil axis provided by the coil conductor 20 extends in a direction parallel to the mounting surface 13 of the component body 12. Therefore, when the inductor 11 is mounted on the mounting substrate, a direction of magnetic flux generated in the coil conductor 20 is parallel to the mounting surface.

Since the first internal terminal conductor 29 and the second internal terminal conductor 30 are respectively configured with an assembly of a plurality of first terminal conductor pieces 29-1 to 29-8 and an assembly of a plurality of second terminal conductor pieces 30-1 to 30-8, they are provided so as to penetrate through the plurality of non-conductive material layers 19 in the laminating direction. Accordingly, the first internal terminal conductor 29 and the second internal terminal conductor 30 can form a relatively wide exposed surface on the outer surface of the component body 12.

Further, the number of turns of the coil conductor 20 may be increased or decreased as necessary. For example, the circulating portions 23-2 and 23-3 provided in connection with the non-conductive material layers 19-4 and 19-5 may be omitted, and the circulating portions 23-6 and 23-7 provided in connection with the non-conductive material layers 19-8 and 19-9 may be omitted, to reduce the number of turns of the coil conductor 20. Conversely, circulating portions corresponding to the circulating portions 23-2 and 23-3 described above may be added, and circulating portions corresponding to the circulating portions 23-6 and 23-7 may be added, to increase the number of turns of the coil conductor 20.

Additionally, some non-conductive material layers 19 that are not provided with conductors such as the coil conductor 20 or the internal terminal conductors 29 and 30 may also be disposed between the non-conductive material layers 19-1 and 19-2 as well as between the non-conductive material layers 19-10 and 19-11 as necessary.

As described above, the first anchor conductor 35 and the second anchor conductor 36 are provided on an interface between adjacent non-conductive material layers of the plurality of non-conductive material layers 19. In this case, as shown in FIG. 4 for the plurality of first anchor conductors 35-1 to 35-6, the plurality of first anchor conductors 35 and the plurality of second anchor conductors 36 form a plurality of strip conductors extending from the first internal terminal conductor 29 and the second internal terminal conductor 30 substantially in a strip shape, respectively. That is, the non-conductive material layer 19 is interposed between adjacent strip conductors of the plurality of strip conductors. According to this configuration, the contact area between each of the anchor conductors 35 and 36 and the component body 12 can be increased, and the fixing force of the internal terminal conductors 29 and 30 to the component body 12 can be further enhanced.

In addition, as shown in FIG. 2, FIG. 3, and FIG. 4, the first anchor conductor 35 and the second anchor conductor 36 extend from the first internal terminal conductor 29 and the second internal terminal conductor 30 toward the top surface 14 of the component body 12, respectively. Therefore, stress due to thermal shock in a reflow process in mounting can be released to a portion away from the mounting surface 13, so that the internal terminal conductors 29 and 30 can be prevented from slipping off. In addition, in a case where force applied to the internal terminal conductors 29 and 30 is in a direction particularly from the top surface 14 of the component body 12 toward the mounting surface 13, it can be said that an effect of improving the fixing force by the anchor conductors 35 and 36 can be further exhibited.

Moreover, as shown in FIG. 2 and FIG. 4, the plurality of strip conductors formed with the respective anchor conductors 35 and 36 extends parallel to each other, and has tip end positions where distances to the top surface 14 of the component body 12 are different from each other. In short, the strip conductors formed with the respective anchor conductors 35-1, 35-3, 35-5, 36-2, 36-4 and 36-6 are shorter than the strip conductors formed with the respective anchor conductors 35-2, 35-4, 35-6, 36-1, 36-3 and 36-5. According to such a configuration, for example, stress concentration due to the thermal shock is alleviated, so that the internal terminal conductors 29 and 30 can be further prevented from slipping off. Note that the plurality of strip conductors is not limited to two types of long and short strip conductors, but may be strip conductors having three or more types of lengths.

Figure 5:
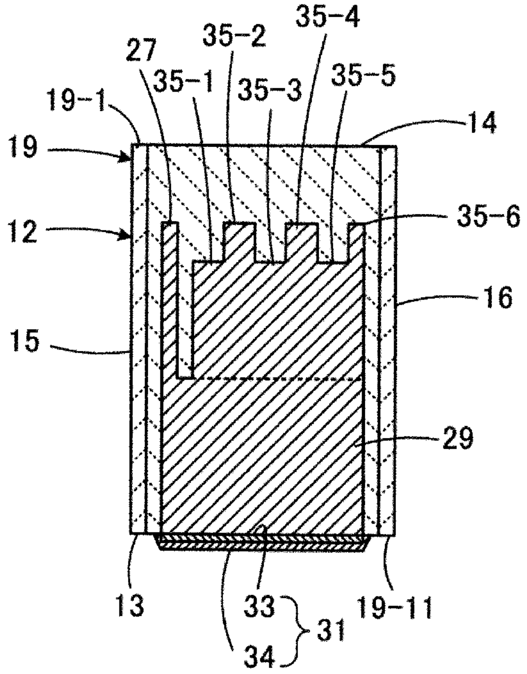
FIG. 5 is a cross-sectional view corresponding to FIG. 4, and shows a modification of a structure shown in FIG. 4.

As described above, the first anchor conductor 35 and the second anchor conductor 36 may not be provided on an interface between adjacent non-conductive material layers of the plurality of non-conductive material layers 19, but may be provided so as to penetrate through the non-conductive material layer 19 in the laminating direction. As a result, as shown in FIG. 5 for the plurality of first anchor conductors 35-1 to 35-6, the plurality of first anchor conductors 35 and the plurality of second anchor conductors 36 extend from the first internal terminal conductor 29 and the second internal terminal conductor 30 in a wide state, respectively. In this case, as shown in FIG. 5, a distance from the tip end position to the top surface 14 of the component body 12 may be different for each of the plurality of first anchor conductors 35 and the plurality of second anchor conductors 36. Also with this configuration, the contact area between each of the anchor conductors 35 and 36 and the component body 12 can be increased, and, for example, the stress concentration due to the thermal shock is alleviated, so that the fixing force of the internal terminal conductors 29 and 30 to the component body 12 can be further enhanced.

Although not shown, the first anchor conductor 35 and the second anchor conductor 36 provided on an interface between adjacent non-conductive material layers of the plurality of non-conductive material layers 19, and the first anchor conductor 35 and the second anchor conductor 36 provided so as to penetrate through the non-conductive material layer 19 in the laminating direction may coexist.

In addition, as can be seen from FIG. 2 and FIG. 3, the first anchor conductor 35 and the second anchor conductor 36 are positioned so as to at least partially respectively overlap the first extended conductor 27 and the second extended conductor 28 when the component body 12 is seen from the first side surface 15 toward the second side surface 16 in a perspective view. In this embodiment, as can be seen from a fact that the first anchor conductor 35 is hidden behind the first extended conductor 27 and the second extended conductor 28 is hidden behind the second anchor conductor 36 in FIG. 3, the first anchor conductor 35 and the second anchor conductor 36 are positioned so as to respectively overlap the first extended conductor 27 and the second extended conductor 28 in a direction parallel to the mounting surface 13. According to such a configuration, it is possible to dispose the conductors in a balanced manner in the component body 12 having the laminated structure.

Note that it is preferable that the first anchor conductor 35 and the second anchor conductor 36 are entirely disposed inside the component body 12 as shown in the figure, but a part thereof may be exposed on the outer surface of the component body 12.

The inductor 11 is manufactured, for example, as follows. FIG. 6A to FIG. 6F show several processes included in a method for manufacturing the inductor 11. FIG. 6A to FIG. 6F are cross-sectional views, in which cross sections at typical four portions are shown as one figure via break lines.

Figures 6A, 6B, 6C, 6D, 6E, 6F:
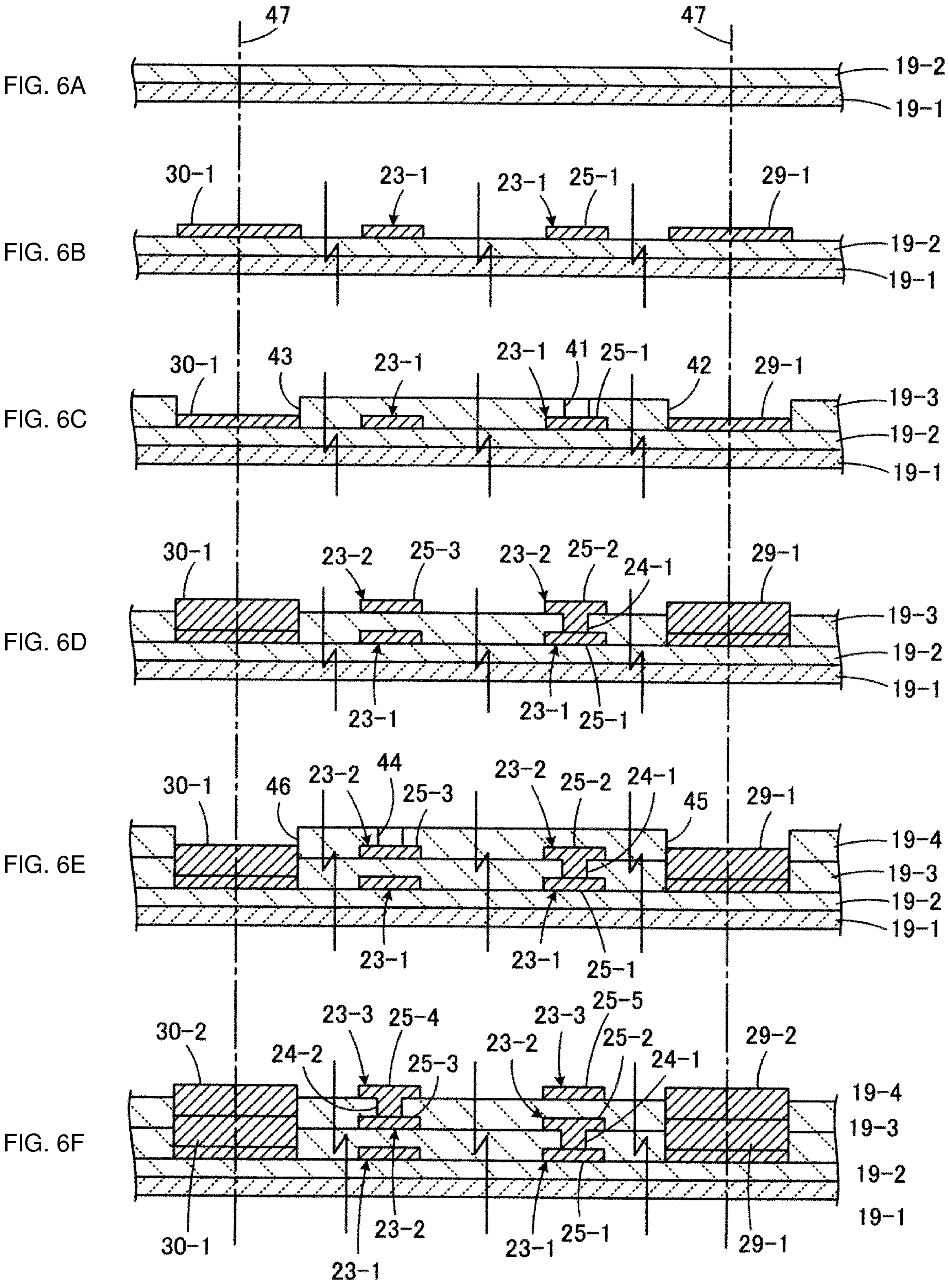
FIG. 6A to FIG. 6F are cross-sectional views illustrating several processes for explaining an example of a method for manufacturing the inductor shown in FIG. 1.

First, as shown in FIG. 6A, the non-conductive material layer 19-2 is laminated on the non-conductive material layer 19-1. As a material of the non-conductive material layer 19 including the non-conductive material layers 19-1 and 19-2, for example, electrically insulating paste obtained by adding ferrite or a metal magnetic material to glass such as borosilicate glass is used. Instead of the glass, resin may also be used. As described above, pigment such as cobalt, for example, is added to the non-conductive material layer 19-1 and the non-conductive material layer 19-11 which will be described later.

Next, as shown in FIG. 6B, a conductive film made of conductive paste containing conductive metal such as silver, for example, is formed on the non-conductive material layer 19-2 as a conductive component, and is patterned. By this patterning, in a region shown in FIG. 6B, the circulating portion 23-1 of the coil conductor 20, the via pad 25-1 which is a part thereof, and a part of the first terminal conductor piece 29-1 and a part of the second terminal conductor piece 30-1 are formed.

Also, to patterning of the conductor film as described above and patterning of the non-conductive material layer 19 to be described later, for example, a photolithography method, a semi-additive method, a screen printing method, a transfer method, or the like is applied.

Next, as shown in FIG. 6C, the non-conductive material layer 19-3 is formed on the non-conductive material layer 19-2, and is patterned. By this patterning, a through hole 41 for the via hole conductor 24-1 is formed at a position corresponding to the via pad 25-1 which is the part of the circulating portion 23-1, and cavities 42 and 43 for respectively exposing the terminal conductor pieces 29-1 and 30-1 are formed.

Next, as shown in FIG. 6D, a conductive film is formed and patterned so as to cover the non-conductive material layer 19-3. By this patterning, the circulating portion 23-2, and the via pads 25-2 and 25-3 which are respective parts of the circulating portion are formed, and a remaining portion of the first terminal conductor piece 29-1 and a remaining portion of the second terminal conductor piece 30-1 are formed. Moreover, conductive paste is introduced into the through hole 41 to form the via hole conductor 24-1.

Next, as shown in FIG. 6E, the non-conductive material layer 19-4 is formed on the non-conductive material layer 19-3, and is patterned. By this patterning, a through hole 44 for the via hole conductor 24-2 is formed at a position corresponding to the via pad 25-3 which is the part of the circulating portion 23-2, and cavities 45 and 46 for respectively exposing the terminal conductor pieces 29-1 and 30-1 are formed.

Next, as shown in FIG. 6F, a conductive film is formed and patterned so as to cover the non-conductive material layer 19-3. By this patterning, the circulating portion 23-3, and the via pads 25-4 and 25-5 which are respective parts of the circulating portion are formed, and the first terminal conductor piece 29-2 and the second terminal conductor piece 30-2 are formed. Moreover, conductive paste is introduced into the through hole 44 to form the via hole conductor 24-2.

After that, a process similar to the process shown in FIG. 6E and a process similar to the process shown in FIG. 6F are repeated a required number of times, and finally, the non-conductive material layers 19-10 and 19-11 are laminated to obtain a mother multilayer body.

Next, the mother multilayer body is cut along cutting lines 47 indicated by dashed-dotted lines in FIG. 6A to FIG. 6F and a cutting line perpendicular to the cutting lines 47, and a plurality of multilayer body chips to be the component body 12 is taken out. According to the cutting along the cutting lines 47 shown in the figure, a surface exposed to a side of the first end surface 17 in the first internal terminal conductor 29 and a surface exposed to a side of the second end surface 18 in the second internal terminal conductor 30 appear. On the other hand, according to the cutting along the cutting line (not shown) perpendicular to the cutting lines 47, surfaces exposed to sides of the mounting surface 13 in the first internal terminal conductor 29 and in the second internal terminal conductor 30 appear.

When the non-conductive material layers 19 contain glass, the multilayer body chips are then sintered. The component body 12 obtained in such a manner is subjected to a barrel polishing process as necessary to form the external terminal conductors 31 and 32, and the inductor 11 is completed.

Second Embodiment

Figure 7:
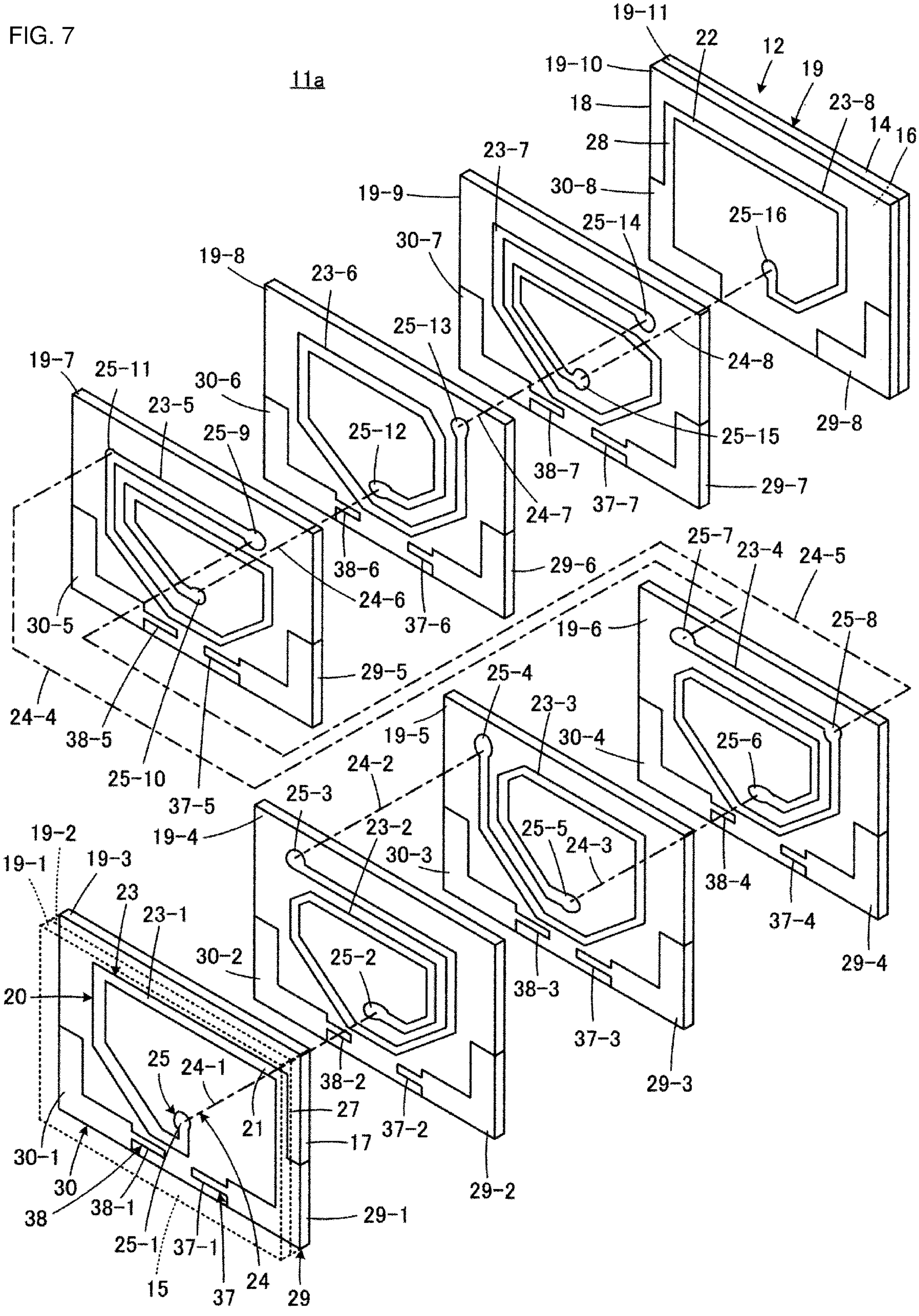
FIG. 7 is a perspective view showing an inductor in an exploded state according to a second embodiment of the present disclosure.
Figure 8:
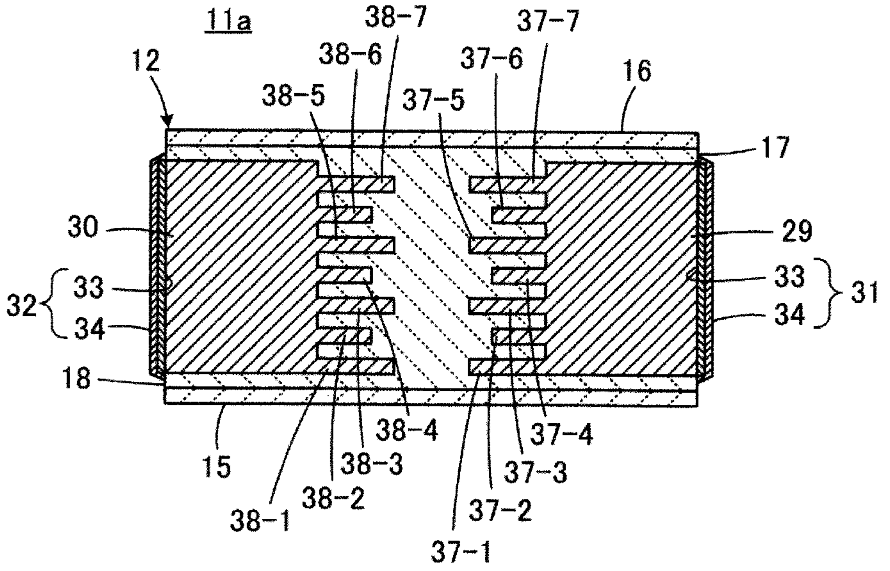
FIG. 8 is a cross-sectional view of the inductor shown in FIG. 7, and shows a cross section corresponding to a cross section taken along a plane B-B in FIG. 1.

With reference to FIG. 7 and FIG. 8, an inductor 11*a* according to a second embodiment of the present disclosure will be described. FIG. 7 is a diagram corresponding to FIG. 2. FIG. 8 is a cross-sectional view of the inductor 11*a*, as in the case of FIG. 4, and shows a cross section corresponding to the cross section along the plane B-B in FIG. 1. In FIG. 7 and FIG. 8, constituent elements corresponding to the constituent elements shown in FIG. 2 and FIG. 4 are denoted by similar reference signs, and duplicate description thereof will be omitted.

The inductor 11*a* shown in FIG. 7 and FIG. 8 differs from the inductor 11 shown in FIG. 2 and FIG. 4 in the positions and extending directions of the anchor conductors.

More specifically, in the inductor 11*a*, a first anchor conductor 37 extends from the first internal terminal conductor 29 toward the second end surface 18 along the mounting surface 13 of the component body 12, and the second anchor conductor 38 extends from the second internal terminal conductor 30 toward the first end surface 17 along the mounting surface 13. Therefore, in particular, it is possible to expect improvement in the fixing force of the internal terminal conductors 29 and 30 to the component body 12 in a vicinity of the mounting surface 13, and it is also possible to prevent the internal terminal conductors 29 and 30 from slipping off due to the thermal shock in the reflow process in mounting. In addition, in a case where the force applied to the internal terminal conductors 29 and 30 is in a direction particularly along the mounting surface 13 of the component body 12, it can also be said that an effect of improving the fixing force by the anchor conductors 37 and 38 can be further exhibited.

In the inductor 11*a*, similarly to the inductor 11 described with reference to FIG. 2 and FIG. 4, the first anchor conductor 37 and the second anchor conductor 38 are provided on an interface between adjacent non-conductive material layers of the plurality of non-conductive material layers 19. In this case, as shown in FIG. 8, the plurality of first anchor conductors 37 and the plurality of second anchor conductors 38 form a plurality of strip conductors extending from the first internal terminal conductor 29 and the second internal terminal conductor 30 substantially in a strip shape, respectively. That is, the non-conductive material layer 19 is interposed between adjacent strip conductors of the plurality of strip conductors. According to this configuration, a contact area between each of the anchor conductors 37 and 38 and the component body 12 can be increased, and the fixing force of the internal terminal conductors 29 and 30 to the component body 12 can be further enhanced.

Additionally, as shown in FIG. 7 and FIG. 8, the plurality of strip conductors formed with the first anchor conductors 37 extends parallel to each other and has tip end positions where distances to the second end surface 18 of the component body 12 are different from each other. Similarly, the plurality of strip conductors formed with the second anchor conductors 38 extends parallel to each other and has tip end positions where distances to the first end surface 17 of the component body 12 are different from each other. In short, the strip conductors formed with the respective anchor conductors 37-1, 37-3, 37-5, 37-7, 38-1, 38-3, 38-5, and 38-7 are longer than the strip conductors formed with the respective anchor conductors 37-2, 37-4, 37-6, 38-2, 38-4, and 38-6. According to such a configuration, for example, stress concentration due to the thermal shock is alleviated, so that the internal terminal conductors 29 and 30 can be further prevented from slipping off.

Additionally, the anchor conductors 37 and 38 shown in FIG. 7 and FIG. 8 have features in that the first anchor conductors 37-1, 37-3, 37-5, and 37-7 forming longer strip conductors and the second anchor conductors 38-1, 38-3, 38-5, and 38-7 forming longer strip conductors respectively face each other, and the first anchor conductors 37-2, 37-4, and 37-6 forming shorter strip conductors and the second anchor conductors 38-2, 38-4, and 38-6 forming shorter strip conductors respectively face each other.

Note that the plurality of strip conductors is not limited to two types of long and short strip conductors, but may be strip conductors having three or more types of lengths.

The first anchor conductor 37 and the second anchor conductor 38 are not provided on an interface between adjacent non-conductive material layers of the plurality of non-conductive material layers 19 as described above, but may be provided so as to penetrate through the non-conductive material layer 19 in the laminating direction, although not shown in the figure. Accordingly, the plurality of first anchor conductors 37 and the plurality of second anchor conductors 38 extend from the first internal terminal conductor 29 and the second internal terminal conductor 30 in a wide state, respectively. In this case, distances from the tip end positions of the plurality of first anchor conductors 37 and the tip end portions of the plurality of second anchor conductors 38 to the first end surface 17 or the second end surface 18 of the component body 12 may be different from each other. Also with this configuration, the contact area between each of the anchor conductors 37 and 38 and the component body 12 can be increased, and, for example, the stress concentration due to the thermal shock is alleviated, so that the fixing force of the internal terminal conductors 29 and 30 to the component body 12 can be further enhanced.

Further, the first anchor conductor 37 and the second anchor conductor 38 provided on an interface between adjacent non-conductive material layers of the plurality of non-conductive material layers 19, and the first anchor conductor 37 and the second anchor conductor 38 provided so as to penetrate through the non-conductive material layer 19 in the laminating direction may coexist.

Figure 9:
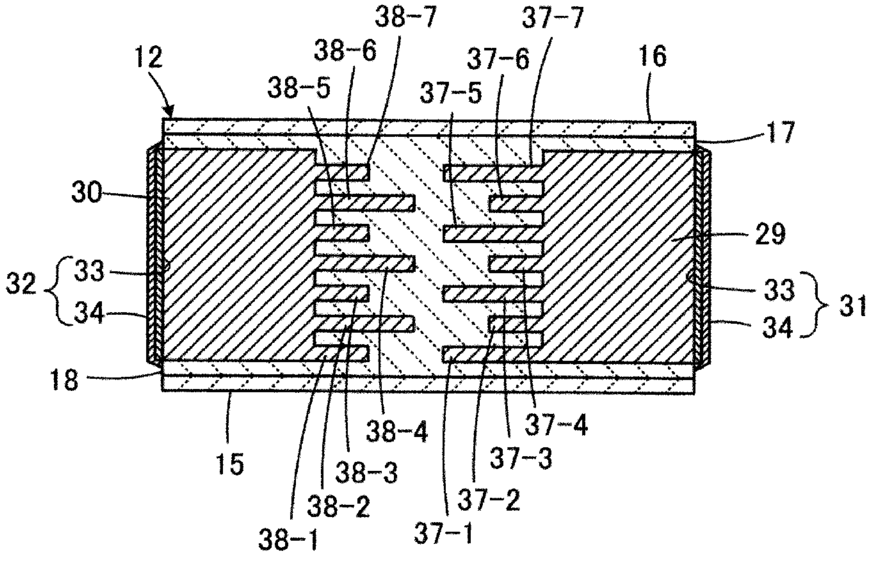
FIG. 9 is a cross-sectional view corresponding to FIG. 8, and shows a first modification of a structure shown in FIG. 8.
Figure 10:
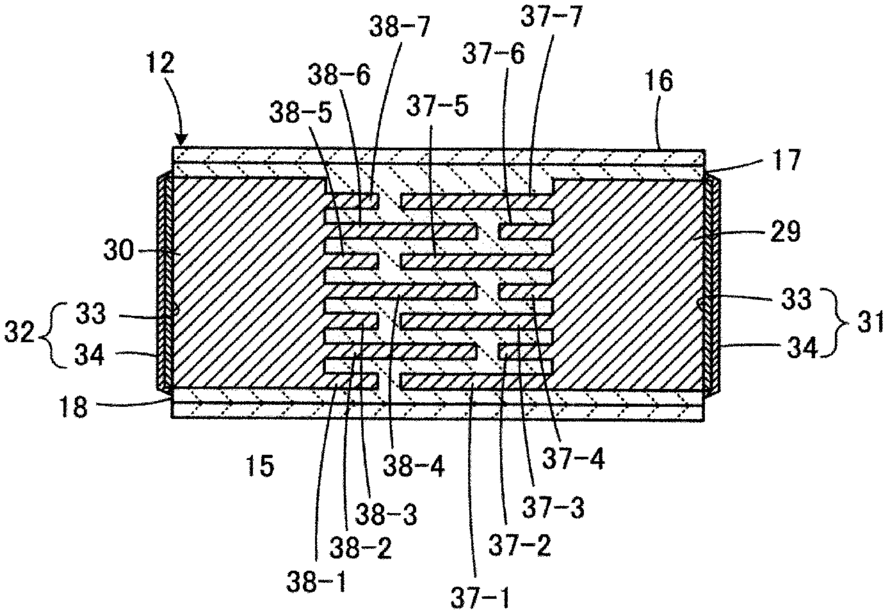
FIG. 10 is a cross-sectional view corresponding to FIG. 8, and shows a second modification of the structure shown in FIG. 8.

For forms of the anchor conductors 37 and 38, a first modification shown in FIG. 9 or a second modification shown in FIG. 10 may be employed.

The first modification shown in FIG. 9 has a feature in which the first anchor conductors 37-1, 37-3, 37-5, and 37-7 forming longer strip conductors and the second anchor conductors 38-1, 38-3, 38-5, and 38-7 forming shorter strip conductors respectively face each other, and the first anchor conductors 37-2, 37-4, and 37-6 forming shorter strip conductors and the second anchor conductors 38-2, 38-4, and 38-6 forming longer strip conductors respectively face with each other.

The second modification shown in FIG. 10 has a feature in which the above-described feature of the first modification shown in FIG. 9 is differentiated. More specifically, the first anchor conductor 37-3 forming the longer strip conductor is positioned between the second anchor conductors 38-2 and 38-4 forming the longer strip conductors, and the first anchor conductor 37-5 forming the longer strip conductor is positioned between the second anchor conductors 38-4 and 38-6 forming the longer strip conductors. Also, the second anchor conductor 38-2 forming the longer strip conductor is positioned between first anchor conductors 37-1 and 37-3 forming the longer strip conductors, the second anchor conductor 38-4 forming the longer strip conductor is positioned between the first anchor conductors 37-3 and 37-5 forming the longer strip conductors, and the second anchor conductor 38-6 forming the longer strip conductor is positioned between the first anchor conductors 37-5 and 37-7 forming the longer strip conductors.

That is, the second modification has a feature in that tip end portions of the strip conductors formed by the first anchor conductor 37 include a tip end portion positioned between adjacent strip conductors of the plurality of strip conductors formed by the second anchor conductor 38, and tip end portions of the strip conductors formed by the second anchor conductor 38 include a tip end portion positioned between the adjacent strip conductors of the plurality of strip conductors formed by the first anchor conductor 37.

According to the second modification, since a positional relationship in which the plurality of first anchor conductors 37 and the plurality of second anchor conductors 38 are engaged with each other is achieved, for example, not only the stress concentration due to the thermal shock can be alleviated, but also the fixing force of the internal terminal conductors 29 and 30 to the component body 12 can be increased, thereby making it possible to further prevent the internal terminal conductors 29 and 30 from slipping off.

Third Embodiment

Figure 11:
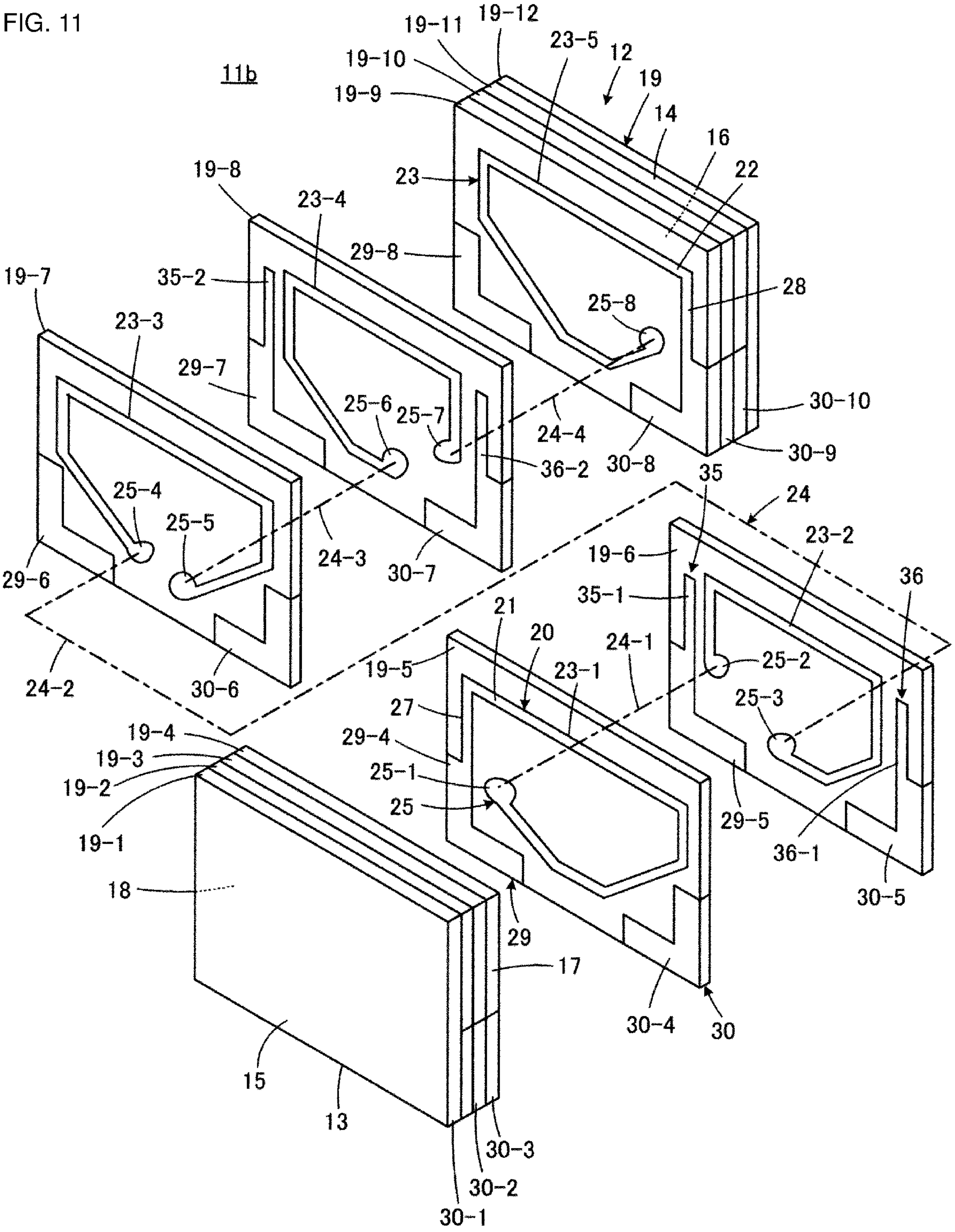
FIG. 11 is a perspective view showing an inductor in an exploded state according to a third embodiment of the present disclosure.
Figure 12:
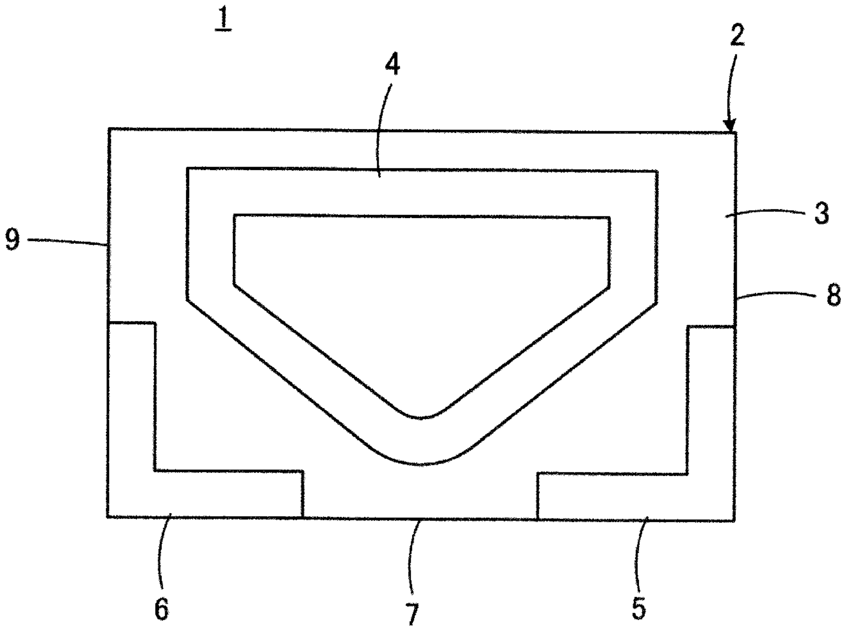
FIG. 12 is a diagram for explaining the inductor 1 described in Japanese Unexamined Patent Application Publication No. 2019-33127, and schematically shows the coil conductor 4 and the internal terminal conductors 5 and 6 which are disposed inside the component body 2 in a perspective view in the coil axis direction of the coil conductor 4.

With reference to FIG. 11, an inductor 11*b* according to a third embodiment of the present disclosure will be described. FIG. 11 is a diagram corresponding to FIG. 2. In FIG. 11, constituent elements corresponding to the constituent elements shown in FIG. 2 are denoted by similar reference signs, and duplicate description thereof will be omitted.

The inductor 11*b* shown in FIG. 11 has, in simple terms, a first feature in that the inductor 11*b* has a portion in which an inner diameter of the coil conductor 20 is larger than those of the inductors 11 and 11*a* described above.

With reference to FIG. 11, the inductor 11*b* includes the component body 12 as in the cases of the inductors 11 and 11*a*. The component body 12 includes the mounting surface 13 facing the side of the mounting substrate, the top surface 14 facing the mounting surface 13, the first side surface 15 and the second side surface 16 connecting between the mounting surface 13 and the top surface 14 and facing each other, and the first end surface 17 and the second end surface 18 connecting between the mounting surface 13 and top surface 14 and between the first side surface 15 and the second side surface 16 and facing each other.

The component body 12 has the laminated structure in which the plurality of non-conductive material layers 19 is laminated. The plurality of non-conductive material layers 19 extends in an extending direction of the first end surface 17 and the second end surface 18 and is laminated in a direction parallel to the mounting surface 13.

The coil conductor 20 extending in a substantially spiral shape is disposed inside the component body 12. The coil conductor 20 includes the first end portion 21 and the second end portion 22 opposite to each other, and includes the plurality of circulating portions 23 extending so as to form a part of an annular orbit along an interface of any of the plurality of non-conductive material layers 19 between the first end portion 21 and the second end portion 22, and the plurality of via hole conductors 24 penetrating through any of the non-conductive material layers 19 in a thickness direction. The coil conductor 20 is given a form extending in the substantially spiral shape by alternately connecting the circulating portions 23 and the via hole conductors 24 described above. The via pad 25 having a relatively large area for connection with the via hole conductor 24 is provided at each end portion of the plurality of circulating portions 23. In FIG. 11, the via hole conductors 24 are indicated by dashed-dotted lines for an electrical connection state thereof.

The first extended conductor 27 and the second extended conductor 28 are respectively connected to the first end portion 21 and the second end portion 22 of the coil conductor 20. The first extended conductor 27 and the second extended conductor 28 are respectively connected to the first internal terminal conductor 29 and the second internal terminal conductor 30. The internal terminal conductors 29 and 30 are partially exposed on the outer surface of the component body 12 while being disposed so as to be embedded inside the component body 12.

Also in this embodiment, the first internal terminal conductor 29 and the second internal terminal conductor 30 are separated from each other and are respectively exposed to a side of the first end surface 17 and a side of the second end surface 18 on the mounting surface 13 of the component body 12, and the first internal terminal conductor 29 is exposed on the first end surface 17 while continuing to the portion exposed on the mounting surface 13, and the second internal terminal conductor 30 is exposed on the second end surface 18 while continuing to the portion exposed on the mounting surface 13.

Although not shown, an external terminal conductor may be provided so as to cover each of the exposed portions of the first internal terminal conductor 29 and the second internal terminal conductor 30.

In the following description, when it is necessary to focus on and describe a specific one of the plurality of non-conductive material layers 19, reference signs such as "19-1", "19-2", . . . , for which sub-numbers are assigned to "19" are used. Also, for the plurality of circulating portions 23, the plurality of via hole conductors 24, the plurality of via pads 25, and the like, the similar usage of reference signs to that in the above-described case of the non-conductive material layer 19 is adopted.

In FIG. 11, 12 non-conductive material layers 19-1, 19-2, . . . , 19-12 are illustrated. These non-conductive material layers 19-1, 19-2, . . . , 19-12 are laminated from the first side surface 15 toward the second side surface 16 in this order.

The non-conductive material layers 19-1 and 19-12 located at the endmost positions are colored different from the other non-conductive material layers 19, for example, by addition of pigment such as cobalt.

Hereinafter, a formation mode of a conductor such as the coil conductor 20 will be described in the order from the non-conductive material layer 19-1 to the non-conductive material layer 19-12. Note that in the inductor 11*b* shown in FIG. 11, a positional relationship between the first extended conductor 27 and the second extended conductor 28 is opposite to that in the case of the inductor 11 shown in FIG. 2.

(1) In the non-conductive material layers 19-2 to 19-4, each of the second terminal conductor pieces 30-1 to 30-3 which is a part of the second internal terminal conductor 30 is provided so as to penetrate through the non-conductive material layers 19-2 to 19-4 in the thickness direction, that is, in the laminating direction.

Although not shown, the first terminal conductor pieces that are a part of the first internal terminal conductor 29 are also provided at symmetrical positions with respect to the second terminal conductor pieces 30-1 to 30-3 in the non-conductive material layers 19-2 to 19-4.

(2) On an interface between the non-conductive material layers 19-4 and 19-5, the first extended conductor 27 and the circulating portion 23-1 continuing thereto and having less than one turn are provided, and the via pad 25-1 is provided at an end portion of the circulating portion 23-1. Although not shown in detail, the via hole conductor 24-1 penetrating through the non-conductive material layer 19-5 in the thickness direction is provided so as to be connected to the via pad 25-1. The first extended conductor 27 is connected to the first internal terminal conductor 29.

The first terminal conductor piece 29-4 which is a part of the first internal terminal conductor 29 and the second terminal conductor piece 30-4 which is a part of the second internal terminal conductor 30 are provided in the non-conductive material layer 19-5 so as to penetrate through the non-conductive material layer 19-5 in the thickness direction.

(3) The circulating portion 23-2 having less than one turn is provided on an interface between the non-conductive material layers 19-5 and 19-6, and the via pads 25-2 and 25-3 are individually provided at both end portions of the circulating portion 23-2. The via pad 25-2 is connected to the via hole conductor 24-1 described above. On the other hand, the via hole conductor 24-2 penetrating through the non-conductive material layer 19-6 in the thickness direction is provided so as to be connected to the via pad 25-3.

In the non-conductive material layer 19-6, the first terminal conductor piece 29-5 which is a part of the first internal terminal conductor 29 and the second terminal conductor piece 30-5 which is a part of the second internal terminal conductor 30 are provided so as to penetrate through the non-conductive material layer 19-6 in the thickness direction.

Further, the first anchor conductor 35-1 extending from the first internal terminal conductor 29 and the second anchor conductor 36-1 extending from the second internal terminal conductor 30 are provided on the interface between the non-conductive material layers 19-5 and 19-6.

(4) The circulating portion 23-3 having less than one turn is provided on an interface between the non-conductive material layers 19-6 and 19-7, and the via pads 25-4 and 25-5 are individually provided at both end portions of the circulating portion 23-3. The via pad 25-4 is connected to the via hole conductor 24-2 described above. On the other hand, the via hole conductor 24-3 penetrating through the non-conductive material layer 19-7 in the thickness direction is provided so as to be connected to the via pad 25-5.

In the non-conductive material layer 19-7, the first terminal conductor piece 29-6 which is a part of the first internal terminal conductor 29 and the second terminal conductor piece 30-6 which is a part of the second internal terminal conductor 30 are provided so as to penetrate through the non-conductive material layer 19-7 in the thickness direction.

(5) The circulating portion 23-4 having less than one turn is provided on an interface between the non-conductive material layers 19-7 and 19-8, and the via pads 25-6 and 25-7 are individually provided at both end portions of the circulating portion 23-4. The via pad 25-6 is connected to the via hole conductor 24-3 described above. On the other hand, the via hole conductor 24-4 penetrating through the non-conductive material layer 19-8 in the thickness direction is provided so as to be connected to the via pad 25-7.

In the non-conductive material layer 19-8, the first terminal conductor piece 29-7 which is a part of the first internal terminal conductor 29 and the second terminal conductor piece 30-7 which is a part of the second internal terminal conductor 30 are provided so as to penetrate through the non-conductive material layer 19-8 in the thickness direction.

Further, the first anchor conductor 35-2 extending from the first internal terminal conductor 29 and the second anchor conductor 36-2 extending from the second internal terminal conductor 30 are provided on the interface between the non-conductive material layers 19-7 and 19-8.

(6) On an interface between the non-conductive material layers 19-8 and 19-9, the circulating portion 23-5 having less than one turn and the second extended conductor 28 continuing thereto are provided, and the via pad 25-8 is provided at an end portion of the circulating portion 23-5. The via pad 25-8 is connected to the via hole conductor 24-4 described above. The second extended conductor 28 is connected to the second internal terminal conductor 30.

In the non-conductive material layer 19-9, the first terminal conductor piece 29-8 which is a part of the first internal terminal conductor 29 and the second terminal conductor piece 30-8 which is a part of the second internal terminal conductor 30 are provided so as to penetrate through the non-conductive material layer 19-9 in the thickness direction.

(7) In the non-conductive material layers 19-10 and 19-11, the second terminal conductor pieces 30-9 and 30-10 which are a part of the second internal terminal conductor 30 are provided so as to penetrate through the non-conductive material layers 19-10 and 19-11 in the thickness direction, respectively.

Although not shown, the first terminal conductor pieces which are a part of the first internal terminal conductor 29 are also provided at symmetrical positions with respect to the second terminal conductor pieces 30-9 and 30-10 in the non-conductive material layers 19-10 and 19-11.

In the inductor **11*b* having the structure described above, when attention is paid to the circulating portions 23-1, 23-3, and 23-5, each of the circulating portions 23-1, 23-3, and 23-5 has a larger inner diameter than those of the circulating portions 23-2 and 23-4. That is, when the configuration of the inductor 11*b* is generalized, in a case where the component body 12 is perspectively viewed from the first side surface 15 toward the second side surface 16, the coil conductor 20 includes the circulating portion 23 which overlaps at least one of the first extended conductor 27 and the second extended conductor 28 or which is closer to the outer surface of the component body 12 than at least one of the first extended conductor 27 and the second extended conductor 28**.

As described above, when the inner diameter of the circulating portion 23 provided in the coil conductor 20 is increased, an inductance value to be obtained by the inductor **11*b*** can be increased, and a Q value can be increased.

The inductor **11*b* has the following features. That is, on each of the interfaces between the non-conductive material layers 19 provided with the respective circulating portions 23-1, 23-3, and 23-5 having the larger inner diameter, a space in which the anchor conductor 35 is to be provided is provided to increase the inner diameter of the circulating portion 23. Therefore, the anchor conductor 35 is provided only on each interface between the non-conductive material layers 19 forming the respective circulating portions 23-2 and 23-4** which do not increase the inner diameter.

From the above description, it appears that the inductor **11*b* shown in FIG. 11 cannot support increasing the inner diameter of the circulating portion and providing the anchor conductor at the same time. However, as a modification of the third embodiment, it is also possible to support both increasing the inner diameter of the circulating portion and providing the anchor conductor on a specific interface between the non-conductive material layers 19. That is, when the inner diameter of the circulating portion is increased only on the side of the first end surface 17, for example, and the anchor conductor is provided on the side of the second end surface 18**, both increasing the inner diameter of the circulating portion and providing the anchor conductor can be supported at the same time.

Further, as shown in FIG. 7, when the anchor conductors 37 and 38 are transferred to positions along the mounting surface 13, the inner diameter of the circulating portion 23 can be increased without being disturbed by the anchor conductors 37 and 38, so that both increasing the inner diameter of the circulating portion and providing the anchor conductor can be supported at the same time.

According to the present disclosure, the first anchor conductor and the second anchor conductor enhance the fixing force of the first internal terminal conductor and the second internal terminal conductor to the component body. Therefore, it is possible to prevent the internal terminal conductor from slipping off due to temperature change or thermal shock.

Although the present disclosure has been described in connection with the illustrated embodiments, other various modifications are possible within the scope of the present disclosure. Also, the embodiments and the modifications described herein are merely exemplary and partial replacement or combination of the configurations is possible among the embodiments and the modifications.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor comprising: a component body made of a non-conductive material; a coil conductor disposed inside the component body, and including a first end portion and a second end portion opposite to each other, and a circulating portion between the first end portion and the second end portion; a first extended conductor and a second extended conductor respectively connected to the first end portion and the second end portion of the coil conductor; and a first internal terminal conductor and a second internal terminal conductor respectively connected to the first extended conductor and the second extended conductor, and partially exposed on an outer surface of the component body while being disposed so as to be embedded inside the component body; wherein the component body includes a mounting surface on which the first internal terminal conductor and the second internal terminal conductor are exposed, the first extended conductor has a first parallel portion extending parallel to the mounting surface, the first parallel portion is connected to the first end portion of the coil conductor, the first extended conductor has a first perpendicular portion extending perpendicular to the mounting surface, the first perpendicular portion is connected to the first internal terminal conductor, and the first perpendicular portion is connected to a top side of the first internal terminal conductor.

2. The inductor according to claim 1, wherein the second extended conductor has a second parallel portion extending parallel to the mounting surface, and the second parallel portion is connected to the second end portion of the coil conductor.

3. The inductor according to claim 2, wherein the second extended conductor has a second perpendicular portion extending perpendicular to the mounting surface, and the second perpendicular portion is connected to the second internal terminal conductor.

4. The inductor according to claim 3, wherein the second perpendicular portion is connected to a top side of the second internal terminal conductor.

5. The inductor according to claim 1, wherein a coil axis of the coil conductor extends in a direction parallel to the mounting surface.

6. The inductor according to claim 5, wherein when the component body is perspectively viewed from a direction parallel to the coil axis, the coil conductor includes the circulating portion has an overlapping part that overlaps with the first parallel portion.

7. An inductor comprising: a component body made of a non-conductive material; a coil conductor disposed inside the component body, and including a first end portion and a second end portion opposite to each other, and a circulating portion between the first end portion and the second end portion; a first extended conductor and a second extended conductor respectively connected to the first end portion and the second end portion of the coil conductor; and a first internal terminal conductor and a second internal terminal conductor respectively connected to the first extended conductor and the second extended conductor, and partially exposed on an outer surface of the component body while being disposed so as to be embedded inside the component body; wherein the component body includes a mounting surface on which the first internal terminal conductor and the second internal terminal conductor are exposed, the first extended conductor has a first perpendicular portion extending perpendicular to the mounting surface, the first perpendicular portion is connected to the first internal terminal conductor, and the first perpendicular portion is connected to a top side of the first internal terminal conductor.

8. The inductor according to claim 7, wherein the second extended conductor has a second perpendicular portion extending perpendicular to the mounting surface, and the second perpendicular portion is connected to the second internal terminal conductor.

9. The inductor according to claim 8, wherein the second perpendicular portion is connected to a top side of the second internal terminal conductor.

10. The inductor according to claim 7, wherein a coil axis of the coil conductor extends in a direction parallel to the mounting surface.

11. The inductor according to claim 10, wherein when the component body is perspectively viewed from a direction parallel to the coil axis, the coil conductor includes the circulating portion has an overlapping part that overlaps with the first perpendicular portion.

* * * * *